United States Patent
Preutz

(10) Patent No.: US 6,869,181 B2
(45) Date of Patent: Mar. 22, 2005

(54) LENS MOUNTING MECHANISM OF SPECTACLES, LENS MOUNTING MEMBER, AUXILIARY SPECTACLES, AND SPECTACLES

(75) Inventor: Staffan Preutz, Boden (SE)

(73) Assignee: Polaris Inter AB, Boden (CH)

( * ) Notice: Subject to any disclaimer, the term of this patent is extended or adjusted under 35 U.S.C. 154(b) by 0 days.

(21) Appl. No.: 10/232,960

(22) Filed: Aug. 30, 2002

(65) Prior Publication Data

US 2003/0058401 A1 Mar. 27, 2003

(30) Foreign Application Priority Data

| Sep. 3, 2001 | (JP) | .......................................... | 2001-265336 |
| May 1, 2002 | (JP) | .......................................... | 2002-129586 |
| Jul. 31, 2002 | (JP) | .......................................... | 2002-223382 |

(51) Int. Cl.[7] .............................................. G02C 5/00
(52) U.S. Cl. ........................... 351/140; 351/57; 351/106
(58) Field of Search ............................. 351/41, 44, 47, 351/48, 57, 58, 83, 103–109, 140, 141

(56) References Cited

U.S. PATENT DOCUMENTS

| 3,515,468 | A | * | 6/1970 | Mitchell | ...................... 351/153 |
| 4,247,178 | A | * | 1/1981 | Cook | ........................... 351/47 |
| 5,026,150 | A | * | 6/1991 | Weber | .......................... 351/47 |
| 5,585,869 | A | * | 12/1996 | Weber | .......................... 351/83 |
| 5,764,330 | A | * | 6/1998 | Simioni | ........................ 351/41 |
| 5,896,186 | A | * | 4/1999 | Roban | ......................... 351/110 |
| 5,943,114 | A | * | 8/1999 | Grendelmeier | ............... 351/47 |
| 5,975,692 | A | * | 11/1999 | Pedron et al. | ................ 351/47 |
| 6,293,672 | B1 | * | 9/2001 | Chen | ............................ 351/47 |
| 6,382,787 | B1 | * | 5/2002 | Xie | .............................. 351/47 |

* cited by examiner

Primary Examiner—Huy Mai
(74) Attorney, Agent, or Firm—Perkins Coie LLP

(57) ABSTRACT

To provide a lens mounting mechanism, a mounting member used for the mechanism, and spectacles using the mechanism, based on a new idea completely different from the conventional art.

There are provided: at least two extending members which have elasticity and extend so as to cross the front, and mounting members which are engaged to lenses and the extending members to fix them. It is preferable that the at least two extending members extend from the center front to the side rear and have ends connected to each other.

26 Claims, 16 Drawing Sheets

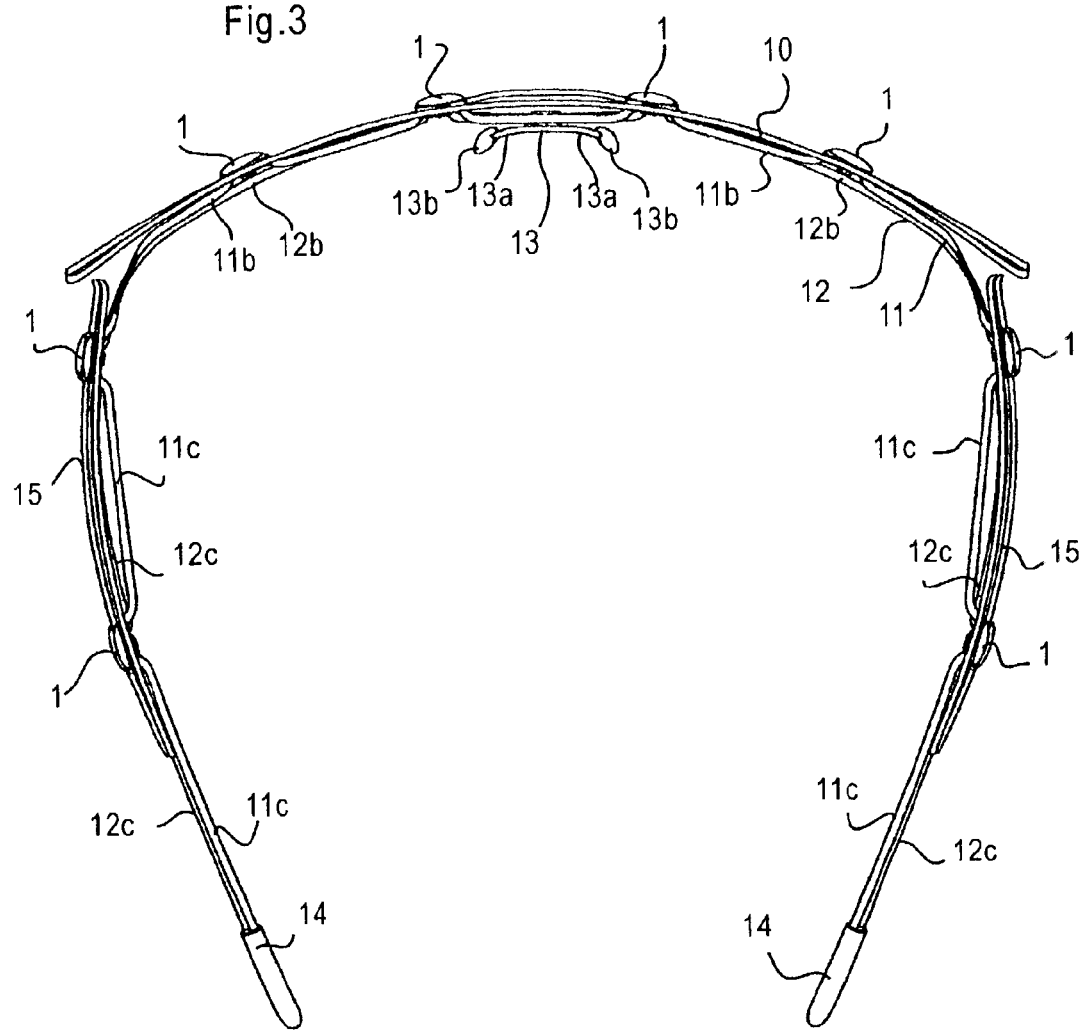

Fig. 4(a)
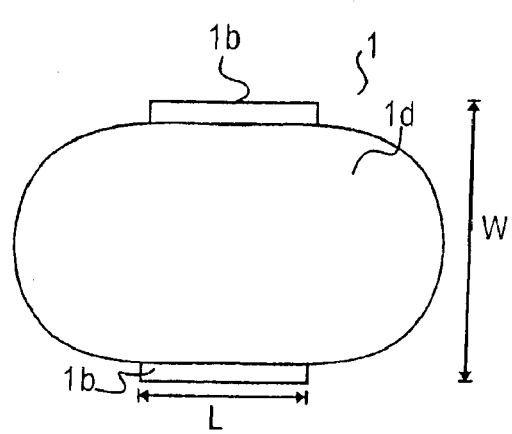
Fig. 4(b)
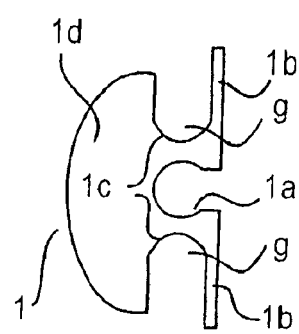
Fig. 4(c)
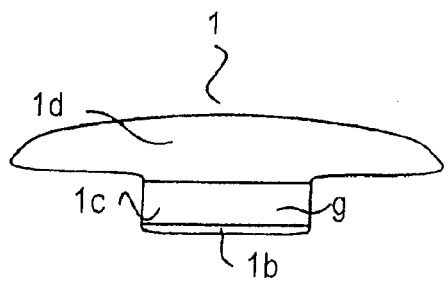
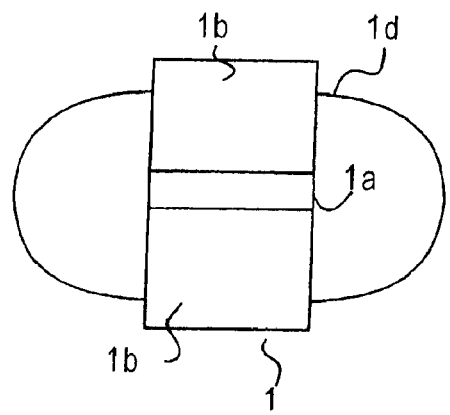
Fig. 4(d)

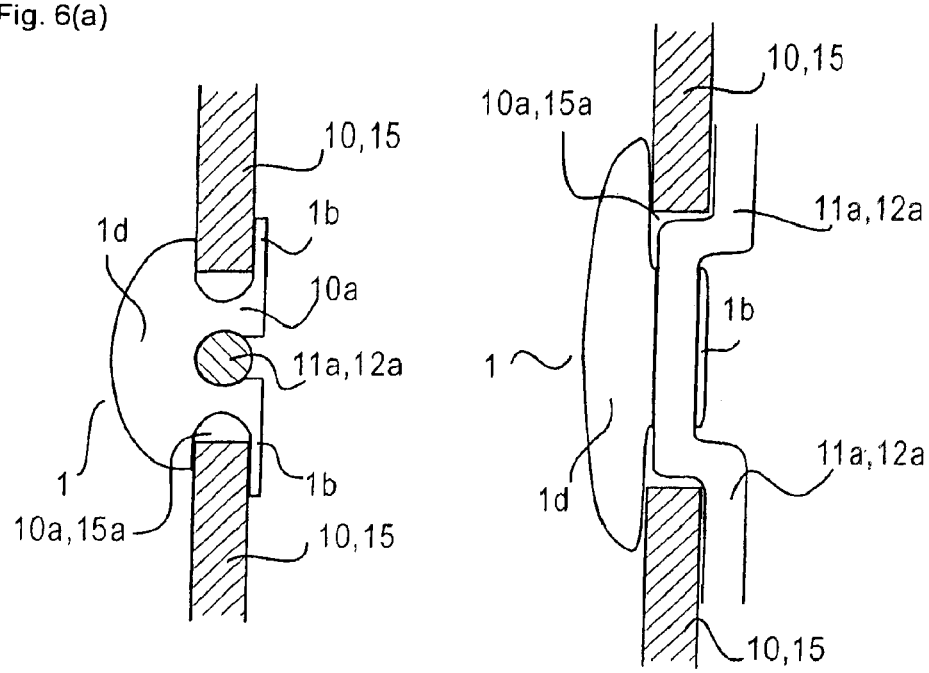
Fig. 6(a)
Fig. 6(b)
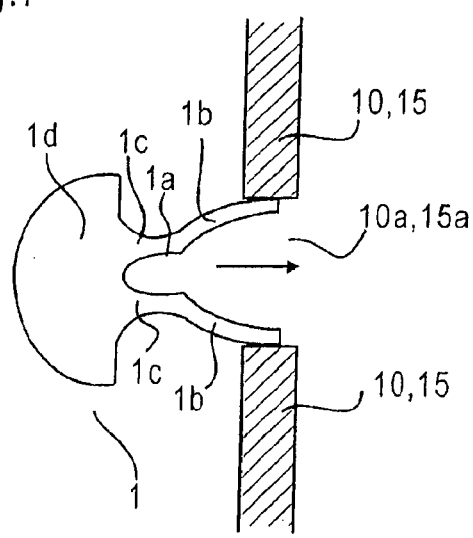
Fig. 7

LENS MOUNTING MECHANISM OF SPECTACLES, LENS MOUNTING MEMBER, AUXILIARY SPECTACLES, AND SPECTACLES

BACKGROUND OF THE INVENTION

1. Field of the Invention

The present invention relates to a new mounting mechanism for spectacles, a mounting member, and spectacles that are different from those of prior art. The present invention further relates to a mounting mechanism, a member, a mounting element, and spectacles of auxiliary spectacles which complement or extend the function of the spectacle body in order to shield light and adjust a design or near and far vision.

2. Description of the Related Art

Conventional spectacles is constituted by extending members called "rims" for sandwiching and fixing lenses, and extending members called "temples" which extend backward from the rims.

For fixation using rims, it is necessary to prepare rims in accordance with a thickness of a lens, and the size of the lenses is inevitably determined by the size of the rims. Therefore, when lenses are formed with a larger size, rims need to be formed in accordance with the size of the lenses, resulting in lack of flexibility.

Meanwhile, spectacles called "rimless" have been known. However, since both ends of lenses are fundamentally supported and fixed by a bridge and temples, a problem of strength occurs, for example, the end of the lens may chip due to strong impact. And since both temples provide relatively weak sandwiching force onto a face, spectacles cannot be stabilized and it has been difficult to positively fix spectacles on a face.

Further, in addition to mounting lenses onto a spectacle body, in order to enhance the function of spectacles or to add functions of correcting vision, shielding light, and so on, auxiliary spectacles have been used for mounting another lens and a light-shielding plate on the front of main spectacles or in the vicinity of the spectacles.

In order to mount such auxiliary spectacles, a suspending mechanism and a screwing mechanism for frames and a bridge of spectacles have been known.

Although such mechanisms are advantageously removable from a spectacle body and are positively held by the spectacle body, the mounting mechanism is heavy and causes uncomfortable wearing, and fatigue is caused after use of long hours. In addition, for more positive fixation, such mechanisms are inconvenient to mount and seriously spoil the appearance.

Japanese Patent Laid-Open No. 2000-231085 discloses a mechanism for mounting auxiliary spectacles that is removable from the front or lenses of spectacles. In the mounting mechanism according to the publication, a bridge is provided between the lenses, holes are formed on both sides of lenses of a spectacle body, and the ends of endpieces are engaged to the holes so as to partially protrude on the front of the lenses. Meanwhile, the auxiliary spectacles to be mounted also have a bridge provided between the lenses. When the auxiliary spectacles are mounted on the spectacle body, while both ends of the lenses of the auxiliary spectacles are sandwiched from both sides by the parts of the endpieces protruding on the front of the lenses of the spectacle body, the bridge of the auxiliary lenses is pressed and hung on the bridge of the spectacle body. The auxiliary spectacles mounted on the spectacle body exercise restoring force by causing the restoring force to act on the bridge of the auxiliary spectacles as force for separating from the bridge of the spectacle body. However, since the bridge of the auxiliary spectacles are hung on the bridge of the spectacle body, the auxiliary spectacles and the spectacle body are connected to each other with more strength.

However, in this structure, since another bridge is necessary for the auxiliary spectacles, weight reduction of the spectacles is limited and the appearance may be spoiled. Further, since the size of the auxiliary spectacles are limited by the size between both sides, a problem may arise when light shielding is expanded.

The present invention provides a new mounting mechanism and a mounting member based on a new idea which solves the above-described problems, achieves weight reduction as possible, fixes lenses firmly, and has an excellent design. Furthermore, in addition to the above effects, the present invention proposes a new mechanism for mounting spectacles and auxiliary spectacles, a mounting member, auxiliary spectacles, and spectacles whereby spectacles with various sizes can be handled, and when shielding of light is required, the size is not limited.

SUMMARY OF THE INVENTION

The present invention provides a lens mounting mechanism of spectacles, the mechanism being characterized by comprising at least two extending members, which have elasticity and extend so as to cross a surface of a lens, and mounting members, which are engaged to the lens and the extending members to fix them. With this configuration, it is possible to provide spectacles having a new configuration which has not been provided conventionally and is quite simple with flexibility.

Further, in the mounting mechanism, the at least two extending members preferably extend from the center to the side rear and are connected to each other at the ends of the members. With this configuration, application to spectacles is quite easy.

Moreover, it is more preferable that at least one of the two extending members is deformed relative to the other extending member to adjust an interval between the extending members, so that a variety of sizes and kinds of lenses can be responded with flexibility. The range of deformation varies among materials of used extending members. Normally, deformation is acceptable within a range permitting elastic deformation. However, when extending members permitting plastic deformation are used, deformation within a range permitting plastic deformation makes it possible to work on a wider variety of arbitrary shapes.

Besides, for a simpler configuration, the extending members may be composed of elastic wire rods.

Also, the at least two extending members are separately formed and have ends connected to each other via connecting members. The connecting members firmly connect the two extending members. The connecting members, the mounting members, the extending members, and the lenses are combined and are fixed firmly.

Furthermore, the mounting members each include a holding part for permitting the mounting member to removably hold the extending member, so that a wider variety of lenses can be responded to.

Further, the connecting members are configured as follows: the extending directions of the extending members from the connecting members can be adjusted by the connecting members, which connect the ends of the extending members so as to respond to the size of the lens and adjust the shape and size of the entire spectacles.

It is more preferable that the lens has a plurality of holes, the mounting members are adapted so as to be inserted to the holes of the lens in such a manner that the holding parts are opposed to the extending members, and the mounting members are adapted so as to prevent movement of the lens on the other surface of the lens.

Further, the mounting member includes an expanded head, a constricted part at the center, and a wing extending on the opposite side of the head. The holding part further has a narrow inlet on the wing to receive the extending member. The constricted part is inserted to the hole formed on the lens, and mounting is made so as to interpose the lens between the expanded head and the wing.

Moreover, a mounting member according to another embodiment includes an inlet having one end opened to receive the extending member, a holding part for forming a cavity connected to the inlet, and a rod extending to the other side. The mounting member is characterized in that a hole is formed on a lens so as to be fit into the rod, and the rod is partially subjected to melt-solidification to form a head in such a manner that the lens is prevented from moving after being fit into the hole.

Also, it is preferable that such a mounting member is integrally molded of plastic. Thus, the mounting member is snapped onto the extending member to mount the lens.

The present invention further provides a mounting member for fixing and supporting a lens in cooperation with an extending member which extends so as to cross a lens surface of spectacles. The mounting member includes an extended head, a constricted part at the center, a wing extending on the opposite side of the head, and a holding part forming an inlet sandwiched by the wing to receive the extending member. The constricted part is inserted to the hole formed on the lens, and mounting is made so as to interpose the lens between the head and the wing.

Also, a mounting member of another embodiment includes an inlet having one end opened to receive the extending member, a holding part for forming a cavity connected to the inlet, and a rod extending to the other side. The mounting member is characterized in that the rod is formed so as to be fit into a hole formed on the lens, and the rod is partially subjected to melt-solidification to form a head in such a manner that the lens is prevented from moving after being fit into the hole.

The present application further provides new spectacles which include a lens, two extending members which have elasticity and extend so as to cross a surface of the lens, and mounting members for removably holding the extending members, characterized in that the mounting members are engaged to the lens and the extending members to fix them.

A more specific example is characterized in that the extending members extend from the front to the sides and have ends connected to each other, and the ends can be hung on ears on both sides of the extending members.

A still more specific embodiment is characterized in that the extending member has a plurality of protruding parts which protrude outward, and the mounting member includes a holding part for removably receiving the protruding part.

Further, in order to respond to a variety of lenses, at least one of the extending members is deformed relative to another extending member to adjust an interval between the extending members.

Moreover, the extending member is composed of a wire rod, thereby achieving a simpler configuration and design.

It is more preferable that the lens has a plurality of holes, the mounting members are adapted so as to be inserted to the holes of the lens in such a manner that the holding parts are opposed to the extending members, and the mounting members are adapted so as to prevent movement of the lenses on the other surface of the lens.

Another embodiment of the present invention provides mounting members for mounting auxiliary spectacles on a spectacle body. The mounting member is characterized by including a holding part which is adapted to hold a part of the spectacle body, and grooves for sandwiching at least a part around a hole or a slit formed on the auxiliary spectacles.

Because of the above characteristic, the mounting member is fixed on the spectacle body by the holding part, and the auxiliary spectacles are partially fit and fixed into the grooves of the fixed mounting members to connect the spectacle body and the auxiliary spectacles. Further, the grooves are configured so as to receive the part around the slit or hole formed on the auxiliary spectacles, so that the size of the auxiliary spectacles is not particularly limited.

Here, it is preferable that the part of the spectacle body that is held by the holding part is a part of an endpiece or a bridge. The part of the endpiece or the bridge is provided as a holding element, so that a new special component is not particularly added to the spectacle body.

Furthermore, it is preferable that the grooves are laterally provided in a pair substantially in parallel. Hence, since the grooves firmly supports and fixes the auxiliary spectacles at the front and rear, stronger connection can be provided.

Also, a more specific embodiment of the mounting member is characterized in that the grooves are formed by flat parts extending to both sides of the holding part and an expanded head formed on the opposite side of the flat parts. Since the auxiliary spectacles are partially received and fixed in the grooves formed on both sides of the holding part, the flat parts are in intimate contact with a surface of the auxiliary spectacles without being shifted. Therefore, the holding part for holding a part of the spectacle body such as an endpiece and a bridge is interposed strongly between the flat parts on both sides, it is possible to prevent loosening of the holding part that may release the held part of the spectacle body.

Further, more preferably, the mounting member is characterized by being made of a flexible material such as silicon and rubber. Thus, the mounting member can be readily fit into the hole or slit of the auxiliary spectacles. Moreover, a flexible member made of a material such as silicon and rubber is used, so that the flat parts fit to a surface of the auxiliary spectacles and are not shifted with ease. Thus, the auxiliary spectacles can be held more firmly.

Besides, another embodiment is characterized in that the mounting member is made of an elastic material such as plastic. Hence, the endpiece and the bridge can be held more firmly and are not removed with ease.

Additionally, the present invention provides spectacles having mounting elements for mounting auxiliary spectacles on the spectacles, characterized in that the mounting elements are protruding parts formed so as to be folded from the front to the rear of the spectacles, and the protruding parts are provided as elements to be held by mounting members for mounting the auxiliary spectacles on the spectacles.

Further, the mounting elements of the spectacles are used as a part of a bridge for connecting lenses of the spectacles, and the part is provided as an element to be held by the mounting members for mounting the auxiliary spectacles on the spectacles. Hence, it is not necessary to provide an extra mounting mechanism on the spectacles and the configuration is quite simple.

More preferably, the mounting element is formed by a wire rod, and a part around the wire rod is held by the mounting member. Thus, the holding of the mounting member is simpler and easier, reducing the weight of the spectacles.

Besides, the present invention provides auxiliary spectacles which are mounted on a spectacle body by mounting members, the auxiliary spectacles being characterized by comprising at least one slit each formed inward from an edge of a lens such that a part of the mounting member is fit and slide in the slit, and holes each formed continuously to the slit at a fixing position of the mounting member. The slits and the holes formed continuously to the slits are provided on the auxiliary spectacles, so that the mounting members can be readily mounted by moving the mounting positions, and the auxiliary spectacles can be freely changed in size. For example, when sunglasses are used as the auxiliary spectacles, it is possible to have a sufficiently wide light-shielding area.

BRIEF DESCRIPTION OF THE DRAWINGS

FIG. 3 is a plan view showing the spectacles of FIG. 1;

FIG. 4 shows a mounting member used for the spectacles of FIG. 1 according to Example 1;

FIG. 6 is a diagram showing a specific embodiment in which a lens is mounted by the mounting member of Example 1 shown in FIG. 4;

FIG. 7 is a schematic view showing a mounting method of a mounting member made of a more flexible material;

DETAILED DESCRIPTION OF THE PREFERRED EMBODIMENTS

Referring to the accompanied drawings, embodiments of the present invention will be discussed below. Here, the configuration described below is an example for understanding the present invention and the present invention is not limited to the configuration.

Figure 1:
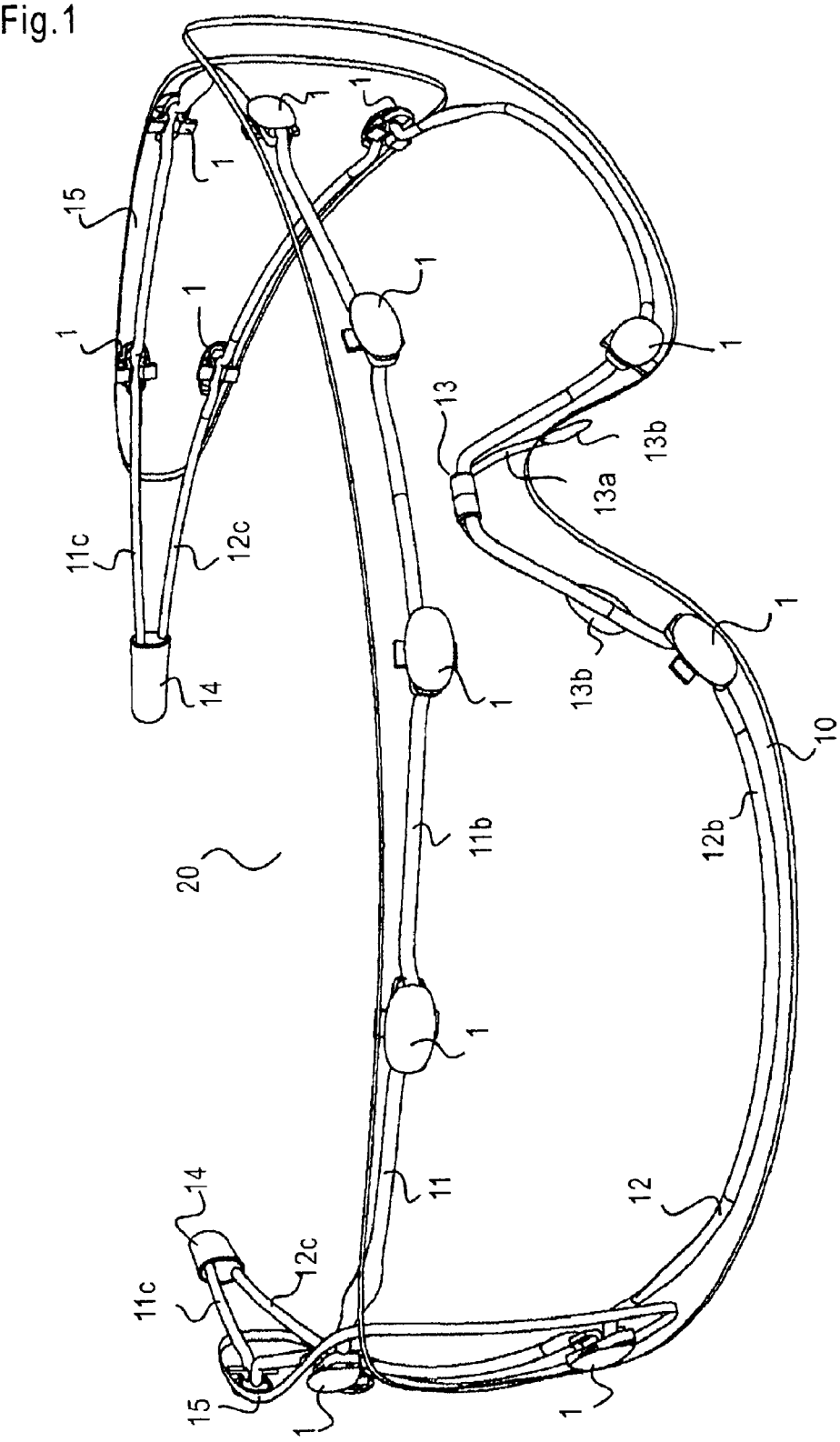
FIG. 1 is a front perspective view showing new spectacles according to Example 1 of the present invention.
Figure 2:
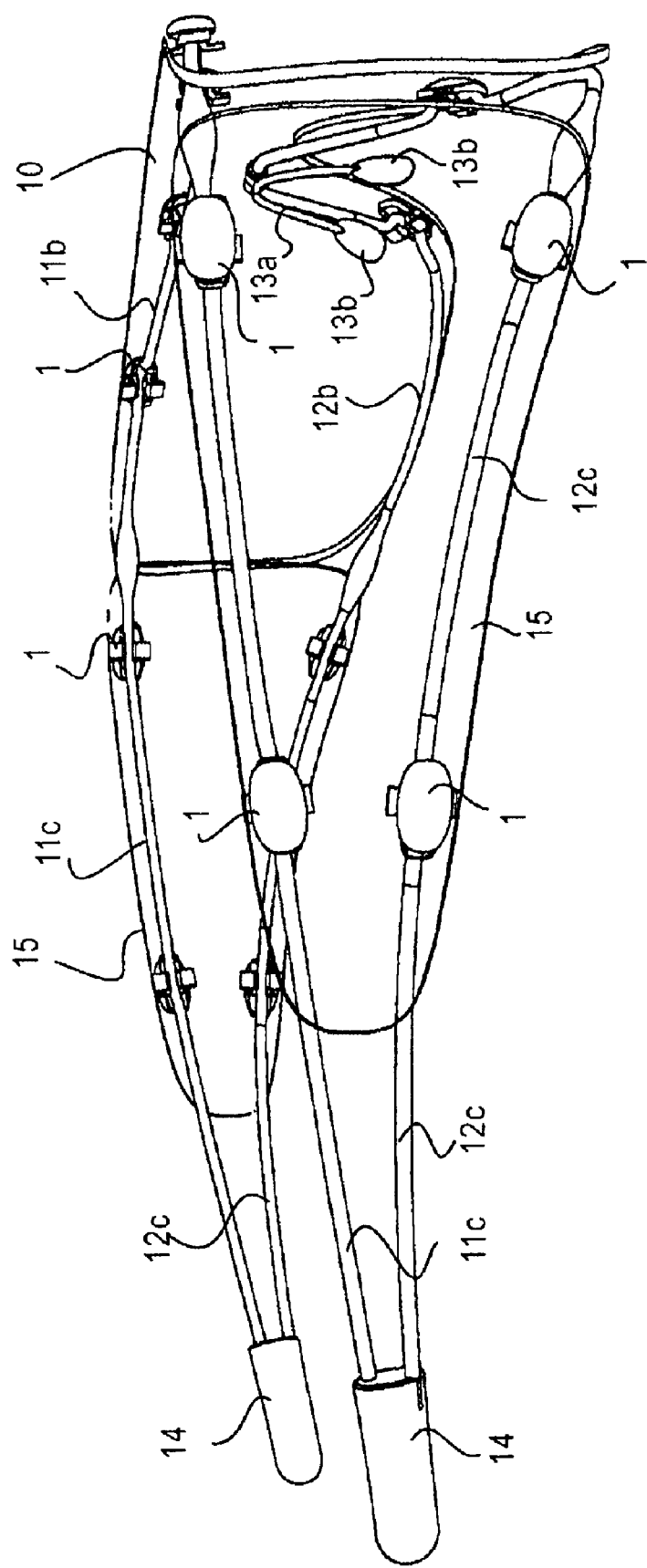
FIG. 2 is a rear perspective view showing the spectacles of FIG. 1.

FIGS. 1 to 3 show spectacles 20 according to Example 1 of the present invention. FIG. 1 is a perspective view taken from the front, FIG. 2 is a perspective view somewhat taken from the rear, and FIG. 3 is a plan view showing the spectacles taken from the above.

The spectacles 20 are constituted by an upper extending member 11 which extends from the center front to the side rears of the spectacles in a substantially symmetrical manner, a lower extending member 12, a front lens 10 attached to the center front of the extending members 11 and 12, a pair of side lenses 15 attached to both sides, and a nose pad 13 composed of a pad supporting part 13a, which extends downward to both sides from the center of the lower extending member 12, and pads 13b attached to the supporting part 13a. Besides, the lenses include a lens for spectacles and sun glasses that is made of glass and plastic, a lens for adjusting vision that is adjusted in focus, and a lens for sun glasses that is made of filter glass without focus adjustment. The lenses are more preferably made of a material such as plastic with light weight, and include a lens made of a variety of materials including glass.

In this example, the upper extending member 11 and the lower extending member 12 can be constituted by slim wire rods having elasticity. The wire rods can be made of a variety of available materials such as titanium and other metals, an alloy of titanium and nickel, etc., and reinforced plastics. The upper extending member 11 and the lower extending member 12 may be made of different chemical elements or may be processed from a single wire rod. In the case of two wire rods, the extending members 11 and 12 are close to each other at the terminal ends of sides 11c and 12c and are connected to each other via connecting members 14. Meanwhile, when the upper extending member 11 and the lower extending member 12 are composed of a single continuous wire rod, the end are connected by one of the right or left connecting members 14 while bending is made on one of the right or left terminal ends, or the two ends are connected by twisting or soldering, brazing, and so on. In addition to the connecting function, the connecting members 14 conceal the ends of the wire rods 11 and 12 so as not to spoil the design.

In the present example, the extending members 11 and 12 are inserted into the connecting members 14 on its ends, and the ends are fixed so as to extend therefrom. Therefore, when the spectacles 20 are suspended on a face, the lower extending member 12 is suspended on ears to support the spectacles. Meanwhile, the connecting member 14 maybe increased in length and may be suspended on ears.

As described above, it is preferable that the extending members 11 and 12 have elasticity. Thus, it is possible to flexibly respond to the size of the lens while maintaining suitable strength of the entire spectacles. Namely, in accordance with the size of the lens, the extending members 11 and 12 or at least one of them are subjected to elastic deformation or plastic deformation to adjust a distance between the extending members. Additionally, in order to increase the strength, adjustment may be made such that one of the extending members 11 and 12 is made of a material having higher elasticity, and the other member is made of a more pliant material, for example, a more flexible material. Furthermore, it is possible to respond to lenses with a variety of sizes also by adjusting positions for inserting the extending members 11 and 12 into the connecting members 14, the extending directions of the extending members 11 and 12, and angles formed by the extending members.

In the present example, parts 11b, and 12b, which extend to the front of the extending members 11 and 12, and parts 11c and 12c extending on the sides are formed by a single continuous wire rod, thereby achieving a quite simple configuration. However, the side parts 11c and 12c and the front parts 11b and 12b may be provided as separated members and may be pivotally connected by hinges and so on.

The upper extending member 11 and the lower extending member 12 extend so as to laterally cross the upper and lower parts respectively on one of the surfaces (internal face) of the lens. And then, the extending members have protruding parts 11a and 12a, which protrude to lenses 10 and 15, to sandwich the lenses between mounting members 1 and the extending members (see FIG. 6(b)). The protruding parts 11a and 12a can be formed by partially bending a wire rod.

On the lenses 10 and 15, holes 10a and 15a where the mounting part 1 can be partially inserted are formed on positions corresponding to the connecting positions of the protruding parts 11a and 12a of the lower extending parts 11 and 12.

On a part of the mounting members 1 inserted in the holes 10a and 15a of the lenses 10 and 15, a holding part (grip part) 1a which can be fitted into the protruding parts 11a and 12a is formed so as to correspond to the protruding parts 11a and 12a formed on the extending parts 11 and 12 (see FIGS. 4 and 6). And the protruding parts 11a and 12a, which are formed on the extending members 11 and 12, and a holding part (grip part) 1a, which is formed on the mounting member 1 inserted in holes 11a and 15a of the lenses 11 and 15, are engaged to each other to sandwich the lenses between both surfaces, that is, the extending parts 11 and 12, the lenses 10 and 15, and the mounting part 1 are engaged to one another. Thus, the spectacles 20 can be integrally combined.

As is evident from FIGS. 1 to 3, with the configuration of the extending members 11 and 12 and the mounting members 1, the side lenses 15 can be widely provided more backward (that is, to the back of a head). Thus, it is possible to effectively shield light entering from the side and to contribute to a more sharp design. Further, even when the protruding parts 11a and 12a of the extending parts 11 and 12 and the lens holes 10a and 15a are slightly shifted by deformation of the extending parts 11 and 12, the spectacles 20 can be combined by some adjustment on deformation.

FIG. 4 is a front view (FIG. 4a) showing the mounting part 1 more specifically, a side view (FIG. 4b), a plan view (FIG. 4c) and, a bottom view (FIG. 4d). FIG. 5 shows an example of the steps of inserting the mounting member 1 into the holes 10a and 15a of the lenses 10 and 15. And FIG. 6 is a sectional view showing from the side a state in which the extending members 11 and 12 are fixed by the mounting member 1 (the protruding parts 11a and 12a of the extending members 11 and 12 are held).

As described above, the mounting members 1 each have an inlet, on which one of the sides is open so as to receive and hold the protruding parts 11a and 12a (parts protruding to the front of the spectacles like U-shaped letters), and a holding part 1a which forms an internal cavity connected to the inlet. The holding part 1a is narrow at its inlet so as not to readily remove the protruding parts 11a and 12a of the extending members 11 and 12 that are temporarily inserted. Preferably, the holding part (grip) 1a is formed so as to fit in the shape of the extending member to receive. In this example, since the extending members 11 and 12 are composed of wire rods which are circular in cross section, the inside of the holding part 1a is formed like a segment, taken from the side, so as to fit in the circle. Further, taken from the side, a flat part (wing) 1b extends to both sides symmetrically from the inlet of the holding part 1a. On the opposite side of the inlet of the holding part 1a, an expanded head 1d is formed. Between the flat parts 1b and the head 1d, a pair of concave parts 1c constricted inside is formed on both sides, and a pair of grooves or slits g is formed between the flat 1b and the head 1d. In the front view and the bottom view, the holding part 1a, the flat parts 1b, and the formed grooves or the slits g extend laterally in parallel, and the concave part 1c is inserted to the holes 10a and 15a formed on the lenses 11 and 15. And then, the protruding parts 11a and 12a of the upper and lower extending members 11 and 12 are further inserted to the holding part 1a, so that the extending members 11 and 12 and the lenses 11 and 15 are combined.

Referring to FIG. 5, the following will discuss amply an example of steps of mounting glass to the upper and lower extending members 11 and 12 by using the mounting member 1.

Figure 5A:
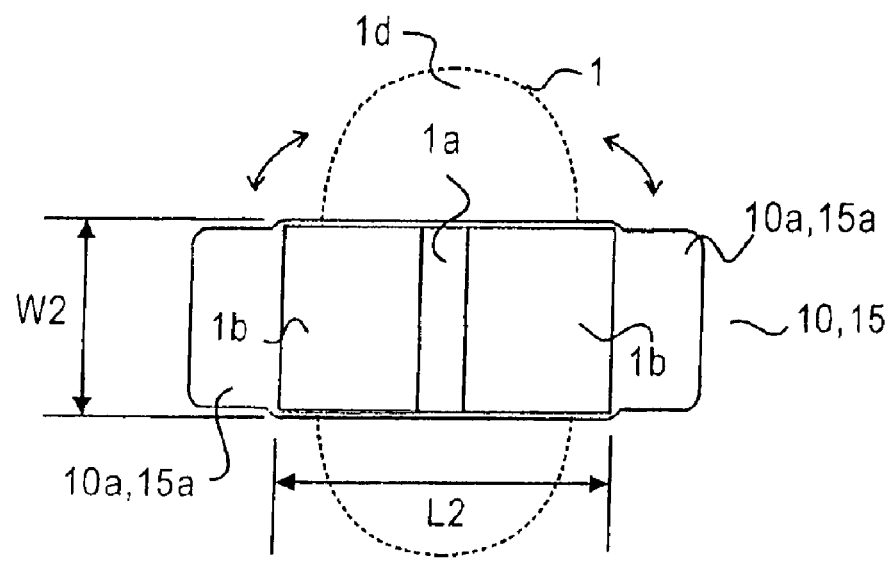
FIG. 5 is a schematic view showing the mounting steps of the mounting member shown in FIG. 4.
Figure 5B:
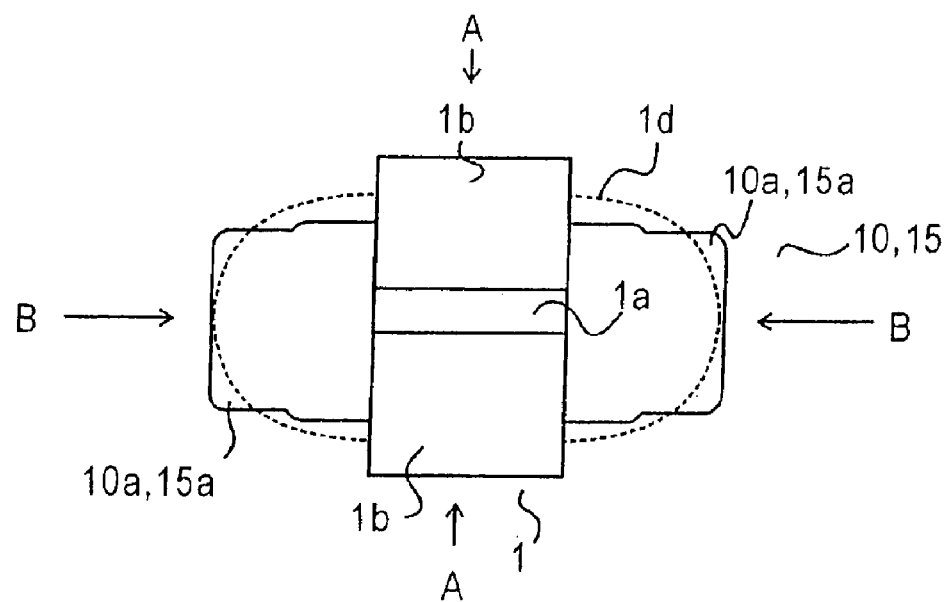

FIG. 5a is a bottom view showing a state in which the flat part (wing) 1b of the mounting part 1 is inserted to the holes 10a and 15a of the lenses 10 and 15 (that is, taken from the flat parts 1b), and FIG. 5b is a bottom view showing a state in which the mounting member 1 is rotated in the direction of arrows shown in FIG. 5a after insertion, and the edges of the holes 10a and 15a are placed in the grooves g of the mounting member 1 and are interposed and fixed between the head 1d and the flat part (wing) 1b.

FIGS. 6a and 6b are sectional views respectively taken along line A—A and line B—B that shows that the protruding parts 11a and 12a of the upper and lower extending members 11 and 12 are further mounted on the mounting member 1 and the lenses 10 and 15 in the state shown in FIG. 5b by the holding part (grip) 1a of the mounting member 1. As shown in FIGS. 6a and 6b, the holding part 1a holds the surrounding part of the wire rods of the protruding parts 11a and 12a, the holes 10a and 15a of the lenses 10 and 15 are inserted to the grooves g of the concave part 1c, and the edges of the holes are interposed and fixed between the flat parts 1b and the head 1d.

The mounting member 1 is preferably molded of a material such as plastic having elasticity in an integral manner. The holding part 1a of the mounting member 1 and the protruding parts 11a and 12a of the extending members 11 and 12 are removable from each other. By pressing the protruding parts 11a and 12a into the inlet of the holding part 1a, the inlet can be opened and the protruding parts 11a and 12a can be snapped onto the holding part 1a.

In this example, the holes 10a and 15a of the lenses 10 and 15 have central parts somewhat larger than both sides, in an area just fitting in the flat parts 1b of the mounting member 1. Moreover, as shown in FIG. 5a, after the flat parts 1b of the mounting member 1 are inserted to a central part 10b of the holes 10a and 15a, the flat parts 1b are rotated by about 90 degrees in the direction of arrows shown in FIG. 5b. Since a width W between the both wings of the flat parts 1b (FIG. 4a) is set larger than a length L of the flat parts 1b and a width W2 of the central part of the holes 10a and 15a of the lenses 10 and 15, the lenses 10 and 15 are interposed between the flat parts 1b of the mounting member 1 and the expanded head 1d and cannot be readily removed. In this state, when the protruding parts 11a and 12a of the upper and lower extending parts are inserted to the holding part 1a, the holding part 1a is slightly deformed to the outside and the protruding parts 11a and 12a are received therein, and then, the holding part 1a is recovered by elasticity. Thus, the holding part 1a is not readily removed from the protruding parts 11a and 12a. Besides, the center of the holes 10a and 15a of the lenses 10 and 15 may have a length L2 shorter than a width W of both wings of the flat parts 1b. In this case, the mounting member 1 may be inserted to the holes 10a and 15a as follows: in a state in which the mounting member 1 is tilted somewhat diagonally, one of the flat parts 1b of the mounting member 1 is shifted into the holes 10a and 15a while being placed therein, one of the edges of the holes 10a and 15a is placed into the grooves g, and then, the opposite flat part 1b of the mounting member 1 is placed into the holes 10a and 15a.

The mounting member 1 is preferably made of an elastic material such as plastic and rigid rubber and may be made of a material such as silicon and rubber with flexibility. In this case, the mounting member 1 may be fitted into the holes 10a and 15a by a method of FIG. 7. Namely, FIG. 7 shows a state in a process in which the flat parts 1b on both wings are folded to pass through the holes 10a and 15a, and the mounting member 1 is inserted to the holes 10a and 15a. Silicon and rubber has high friction on surfaces. Therefore, a design is made such that the surfaces of the flat parts 1b are fitted in a surface of the lens, so that it is possible to prevent making a shift with ease. In addition, since the flat parts 1b sandwich the inlet of the holding part 1a from both sides, it is possible to prevent the protruding parts 11a and 12a, which are fitted into the holding part 1a once, from being removed with ease.

Next, referring to FIGS. 8 to 11, the following will discuss spectacles according to Example 2 of the present invention. Here, since the basic idea is similar to that of Example 1, only particularly different points will be described.

Figure 8:
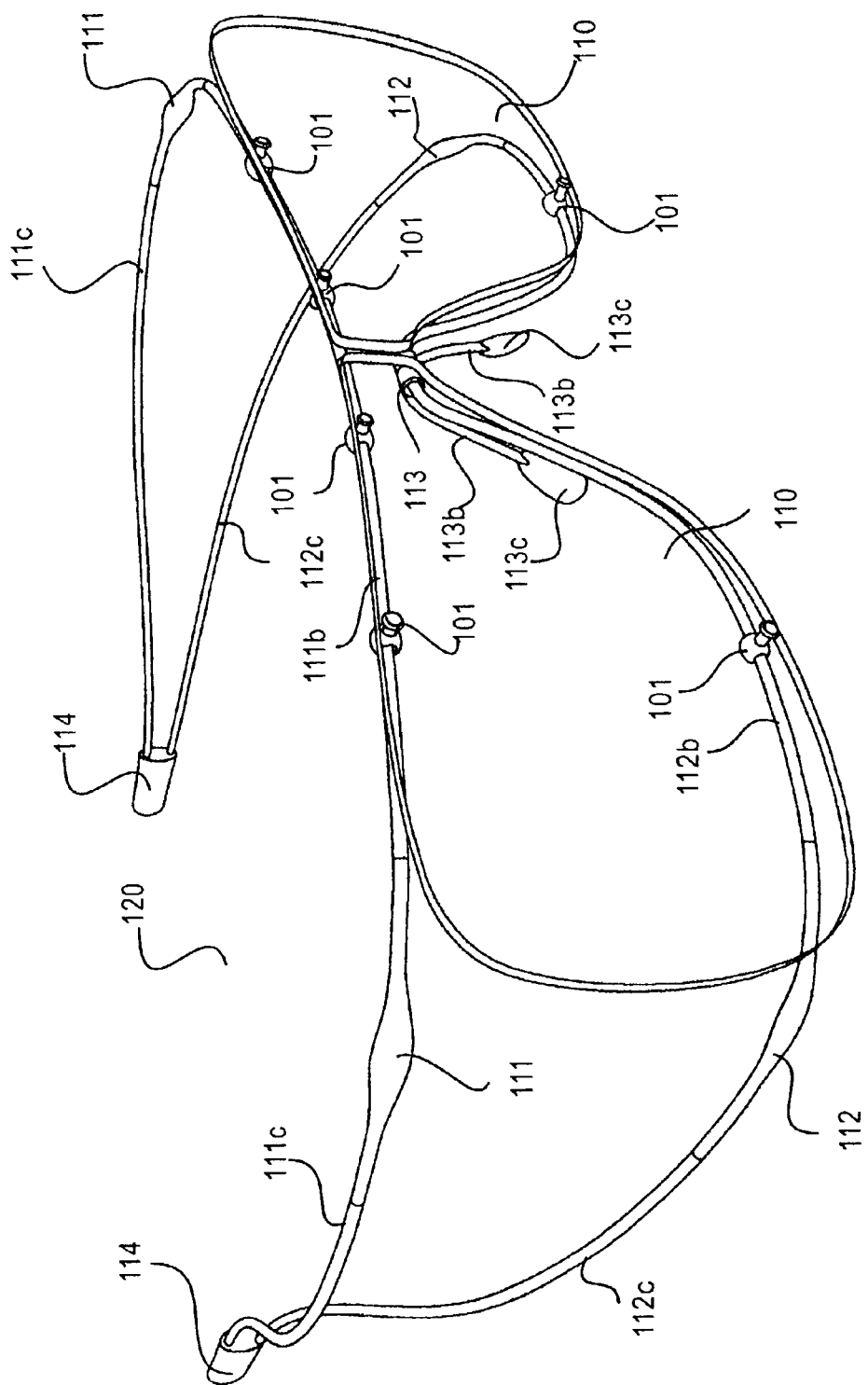
FIG. 8 is a front perspective view showing new spectacles according to Example 2 of the present invention.
Figure 9:
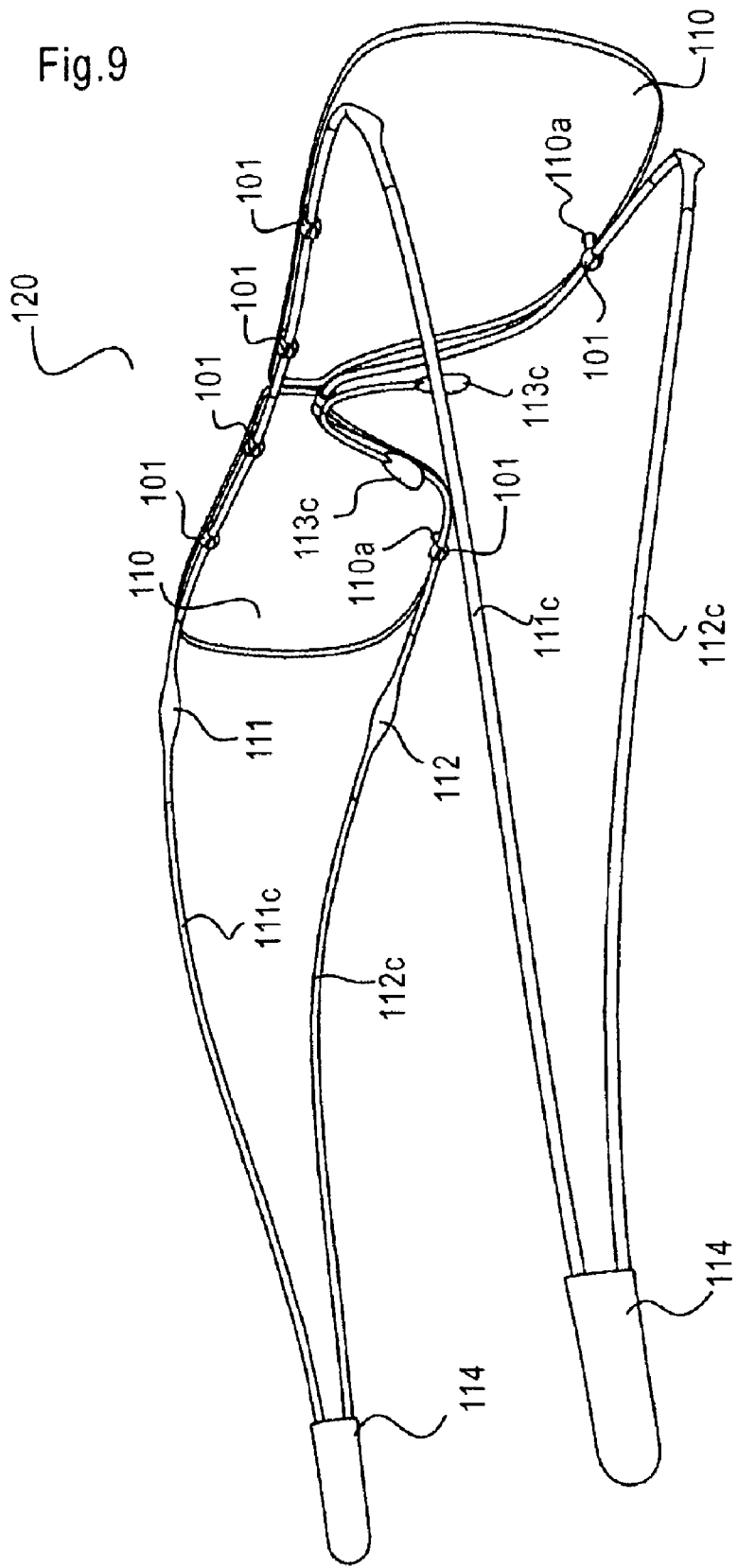
FIG. 9 is a rear perspective view showing the spectacles of FIG. 8.

FIGS. 8 and 9 are a perspective view (FIG. 8) taken from the front of spectacles 120 and a perspective view (FIG. 9) somewhat taken from the rear of the spectacles 120 according to Example 2 of the present invention.

The spectacles 120 are constituted by an upper extending member 111 which extends from the center front to the side rears of the spectacles in a substantially symmetrical manner, a lower extending member 112, two symmetric front lenses 110 attached to the outer front of the extending members 111 and 112, and a nose pad 113 composed of a pad supporting part 113a, which extends downward to both sides from the center of the lower extending member 112, and pads 113b attached to the supporting part 113a. This example is particularly different from the spectacles 20 of Example 1 in that lenses 15 on both sides are removed, the two lenses 110 on the right and left are used, and the lenses are supported and fixed by the mounting member 101 on three points in the spectacles 120. However, the lenses 15 on both sides can be mounted as necessary.

The upper extending member 111 and the lower extending member 112 extend so as to laterally cross the upper and lower parts respectively on one of the surfaces (internal face in this example) of the lens 110. However, protruding parts 11a and 15a (FIG. 6) provided specially on the spectacles 20 are not provided in this example but the parts of the extending parts 111 and 112 are just held by the mounting member 101.

Figure 10:
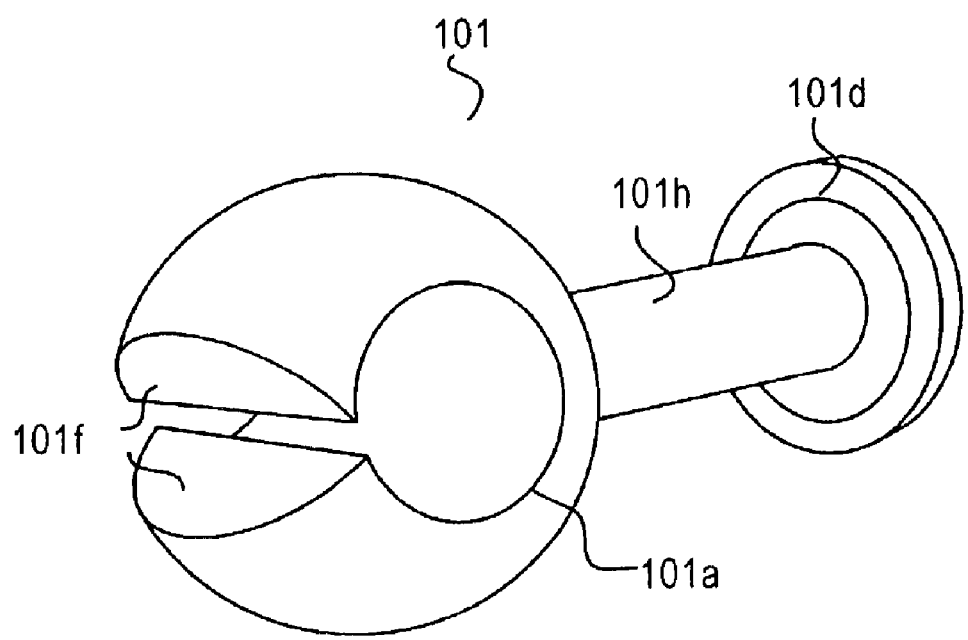
FIG. 10 is a perspective view showing a mounting member used in FIG. 8.

FIG. 10 is a perspective view showing a more specific example of the mounting member 101. The mounting members 101 each have an inlet, on which one of the sides is open to the outside so as to hold the parts of the upper and lower extending members 111 and 112, and a holding part 101a which forms an internal cavity connected to the inlet. The inlet has lips 101f which are closer to each other along the inside direction, so that when the upper and lower extending members 111 and 112 are pressed onto the lips 101f, the inlet is opened to the outside. Further, the inlet 101f is smaller than the diameters of the extending members 111 and 112 so as not to permit the extending members 111 and 112, which are inserted once to the inside of the holding parts 101a, to be readily removed. Hence, once the extending members 111 and 112 are inserted and held in the holding parts 101a, the extending members 111 and 112 are not readily removed due to elasticity of the holding parts 101a. The inside of the holding part 101a is preferably fitted in the shape of the extending member to be received. In this example, since the extending members 111 and 112 are constituted by wire rods which are circular in cross section, the inside of the holding part 101a is formed like a segment, taken from the side, so as to fit in the circle. To enhance holding force, the mounting member 101 has elasticity of a material such as plastic and rigid rubber and can be fused by heat.

On the opposite side of the inlet of the holding part 101a, the expanded head 101d is formed. The holding part 101a and the expanded head 101d are larger in diameter than a hole 110a of the lens 110. Further, the holding part 101a, the head 101d, and a rod 101h extending between the holding part 101a and the head 101d are integrally formed. Moreover, the wire rod 101h is adjusted in diameter so as to be strongly fitted into the hole 110a provided on the lens 110.

Figure 11A:
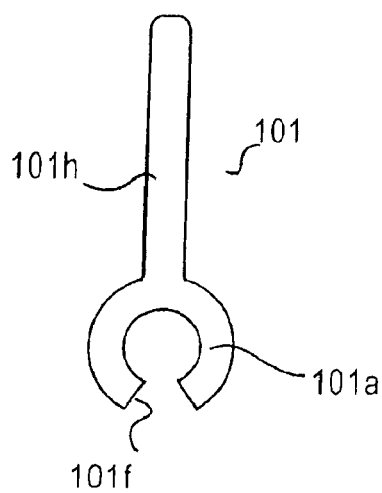
FIG. 11 is a side view showing the mounting member of FIG. 8 as a single member and a state in which the mounting member is used on the spectacles.
Figure 11B:
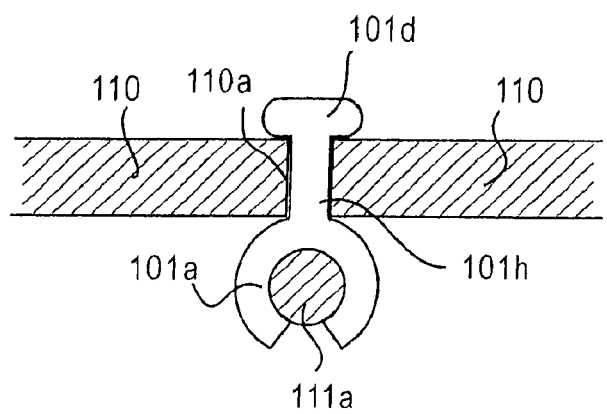

As shown in FIG. 11a, before mounting on the lens 110, the holding member 101 is normally constituted by the holding part 101a and the rod 101h, which extends therefrom, and is terminated. The head 101d is not formed. Moreover, the rod 101h is sufficiently longer than the thickness of the lens 110 to be used. If necessary, the holding member 101 having the rod 101h is prepared so as to be used for lenses with various thicknesses. The rod 101h is sufficiently longer than the thickest lens.

In the case of insertion to the lens 110, that is, when the rod 101h is sufficiently and strongly inserted to the hole 110a of the lens, the end of the rod 101h is heated and fused, and the expanded head 101d is formed and is set as it is. Thus, the mounting member 101 once mounted to the hole 110a of the lens 110 interposes the lens 110 between the holding part 101a, which is larger than the hole 110a, and the expanded head 101d. Thus, movement in the lens 110 is prevented and removal is not permitted.

The holding part 101a of the mounting member 101 and the extending members 111 and 112 are removable from each other. By pressing the extending parts 111 and 112 into the inlet of the holding part 101a, the inlet is opened and the extending members 111 and 112 can be snapped into the holding part 1a.

Regarding the mounting member 1 and the mounting member 101, the size of the holding member, the used material, the thickness of the holding part, and so on are selected to obtain sufficient holding force not permitting the lens to be removed by tensile force, which is applied to the lens in a normal condition for use (for example, in the case where the lens is subject to centrifugal force caused by a head movement or a certain engagement). Meanwhile, the lens can be removed from the extending members 111 and 112 by intentionally applying force larger than the holding force. Thus, lenses can be combined freely, for example, the lens can be replaced with a different kind of lens or another lens can be added. Also, a partially broken lens can be replaced with a new one, and cleaning can be performed only on a lens, thereby achieving quite simple storage and handling of lenses.

The following will discuss an example of mounting another mounting member to auxiliary spectacles in accordance with accompanied drawings.

Figure 12:
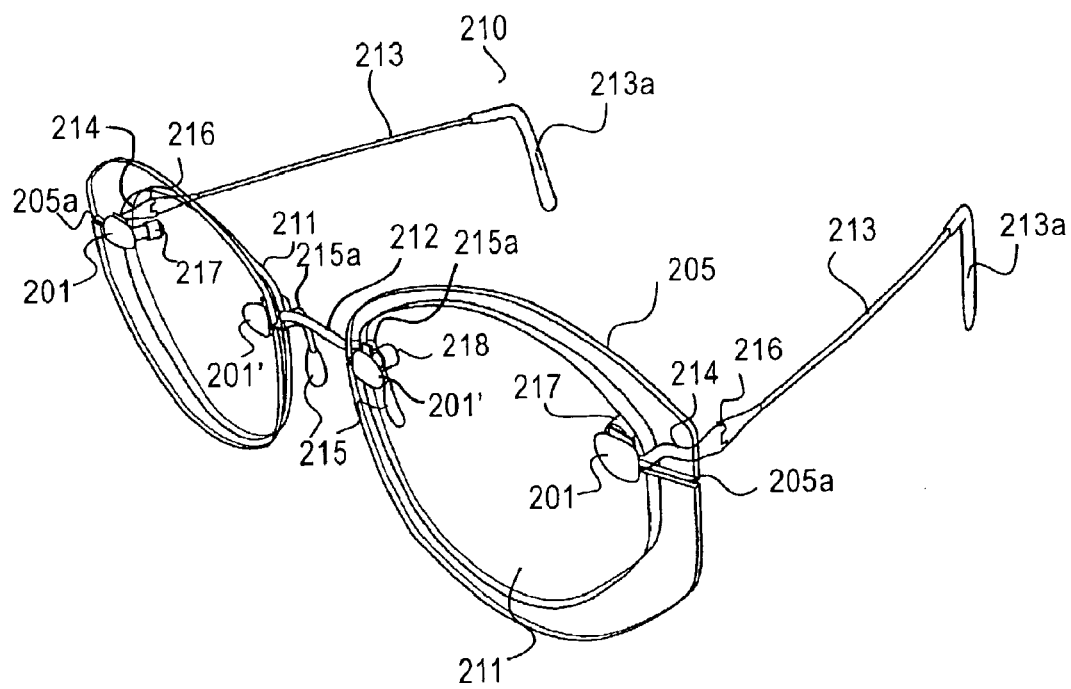
FIG. 12 is a perspective view showing a state in which auxiliary spectacles are mounted on a spectacle body.
Figure 13:
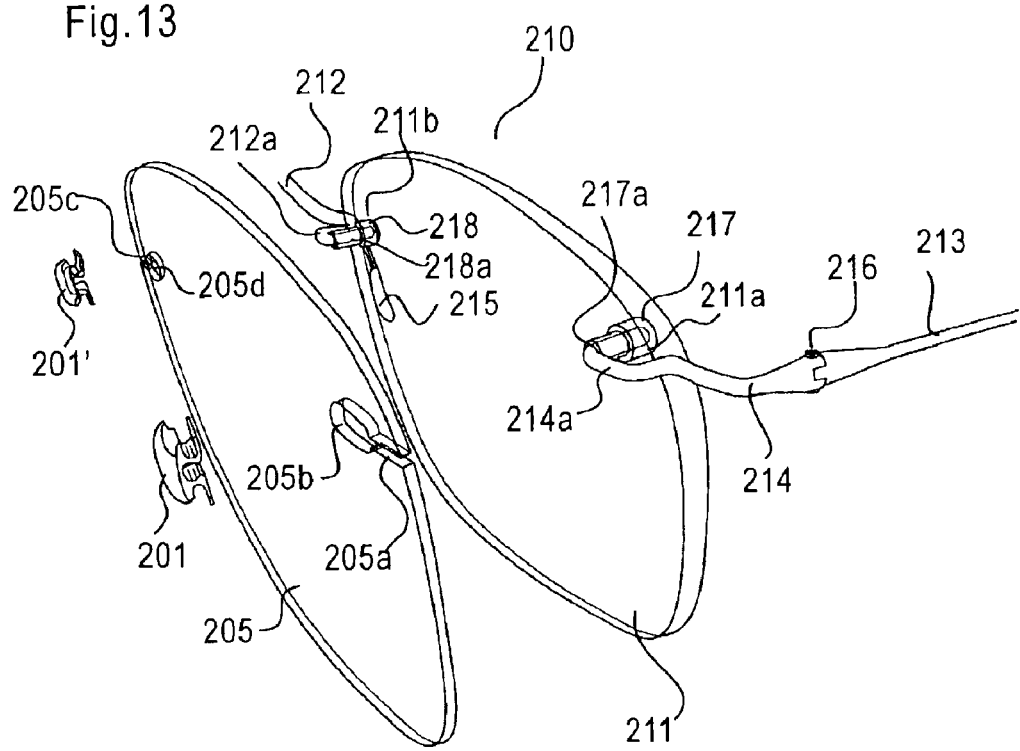
FIG. 13 is perspective view showing that the spectacle body, the auxiliary spectacle, and the mounting members are separated.
Figure 14A:
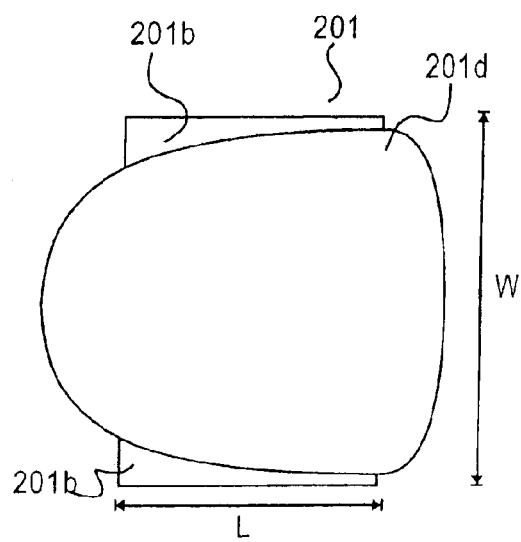
FIG. 14 is an external view showing a mounting member 201.
Figure 14B:
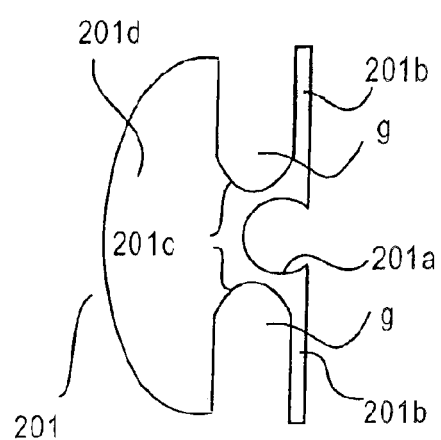
Figure 14C:
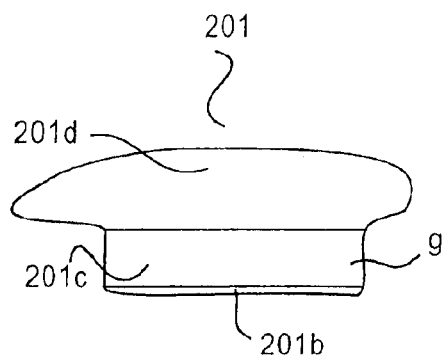
Figure 14D:
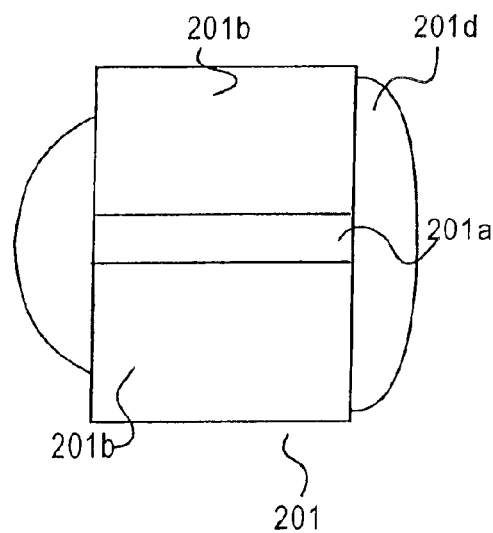

FIG. 12 is a perspective view showing a state in which auxiliary spectacles 205 are mounted to a spectacle body 210 by mounting members 201 and 201', and FIG. 13 is a perspective view showing a state in which a part of the spectacle body 210, one of the auxiliary spectacles 205, and the mounting members 201 and 201' are separated.

In this example, the spectacle body 210 is so-called rimless spectacles having two holes on the lens. The schematic configuration is that a pair of lenses 211 are connected symmetrically by a bridge 212, lens connecting parts 214 generally called end pieces are mounted on both sides on the lenses 211 to connect the lenses and temples, and temples 213 are formed so as to extend in parallel at the rear of the lenses 211. The endpieces 214 and the temples 23 are hinged and connected to each other via screws such that the temples 213 can be opened or closed. Bow side ends 213a are provided in the rear of the temples 213. Pad arms 215a are mounted and extended below on both sides of the bridge 212 to support the spectacle body 210 on a nose, and nose pads 215 are formed on the ends of the pad arms 215a.

The bridge 212, the temples 213, and the endpieces 214 are all formed by thin wire rods for weight reduction. For example, they may be produced by molding metal such as titanium, a metallic alloy of titanium and nickel, or plastic and the like.

In order to connect the endpieces 214 and the bridge 212 to the lenses 211, holes 211a and 211b are formed respectively on both sides of the lens 211. Further, supporting members 217 and 218, which conform to the size of the holes 211a and 211b, are inserted so as to be fitted and fixed into the holes 211a and 211b. Holes 217a and 218a, which are opened on the front of the lens 211 at the time of insertion to the holes 211a and 211b, are formed on the supporting members 217 and 218. The bridge 212 has both ends inserted and fixed into the holes 218a of the supporting members 218 mounted on the right and left lenses 211, and the bridge 212 slightly extends to the rear while forming a U-shaped part 212a, which bends and protrudes on the front of the lenses 211, and then, the bridge 212 extends so as to cross a part between the lenses 211 while changing its direction from the center to the front. The ends of the right and left endpieces 214 are inserted and fixed into holes 217a of the supporting members 217 on the right and left lenses 211, the endpieces 214 pass through the sides of the lenses 211 and extend to the rear while forming U-shaped parts 214a, which bends to the rear and protrudes on the front of the lenses 211, and the endpieces 214 are connected to the temples 213 via screws 216 so as to be folded.

As an example, slits 205a and 205c extending from the outer side to the inside are formed on both sides of the auxiliary spectacles 205 constituted by a pair of single glasses. Holes 205b and 205d are formed from both sides somewhat to the inside of the auxiliary spectacles so as to be continuous respectively to the slits 205a and 205c.

Figure 15:
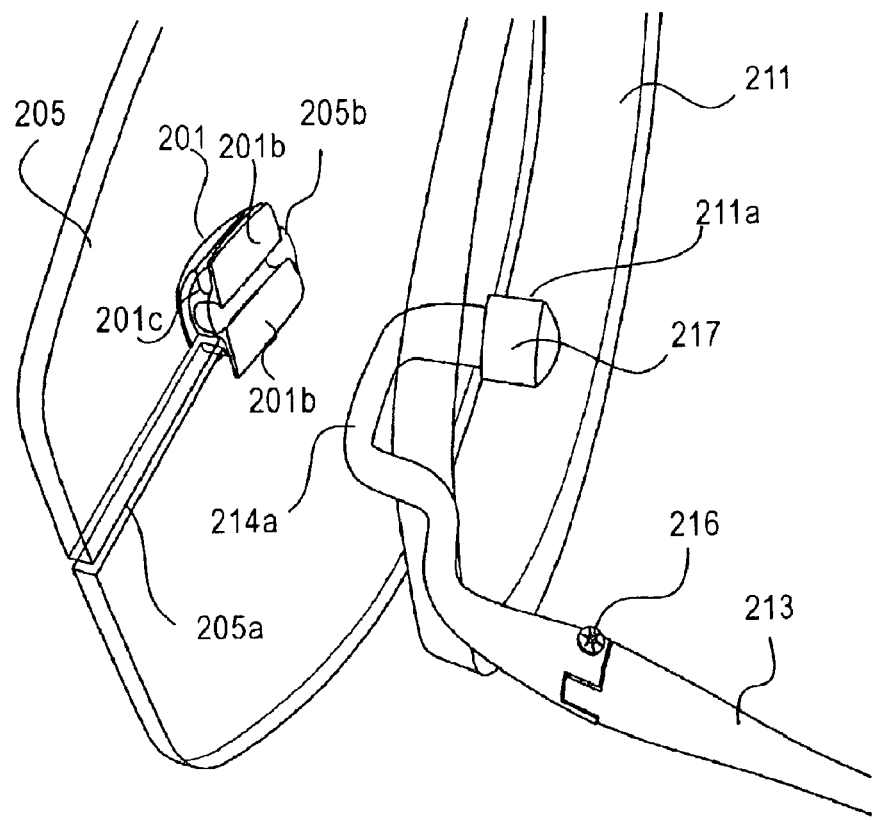
FIG. 15 is a rear perspective view showing a state in which the mounting member 201 is inserted to a hole 205b of auxiliary spectacles 205.

FIG. 14 includes a front view (FIG. 14a), a side view (FIG. 14b), a plan view (FIG. 14c), and a bottom view (FIG. 14d) of the mounting member 201. The mounting member 201 has a holding part (grip) 201a, which is adjusted to conform to the diameter of the wire rod of the endpiece 214 such that the holding part 201a holds a part of the endpiece 214 mounted on the spectacle body 210 on one of the sides, in this example, the U-shaped part 214a of the endpiece 214 that protrudes on the front of the spectacles. Besides, in this example, since the wire rod of the endpiece 214 is substantially circular in cross section, the inside of the holding part 201a is formed like a segment in the side view so as to fit in the circle. Further, taken from the side, flat parts 201b extending to both sides are formed from the holding part 201a. Moreover, an expanded head 201d is formed oppositely to the holding part 201a. A pair of concave parts 201c constricted inward is formed between the flat parts 201b and the head 201d so as to form a pair of grooves or slits g between the flat parts 201b and the head 201d. The holding part 201a, the flat parts 201b, and the formed grooves g extend laterally in parallel in the front view and the bottom view. As shown in a rear perspective view of FIG. 15, depressions forming the concave parts 201c are fit into the hole 205b of the auxiliary spectacles 205, and at least a part around the hole 205b is fit into the grooves between the flat parts 201b and the and the head 201d for fixation. Further, the U-shaped part 214a, which is the protruding part of the endpiece 214, is fit into the holding part 201a, so that the spectacle body 210 and the auxiliary spectacles 205 are connected on the sides. Additionally, when the U-shaped part 214a of the endpiece 214 is long, a length L (see FIG. 14a) of the flat part 201b may be increased accordingly.

Figure 16A:
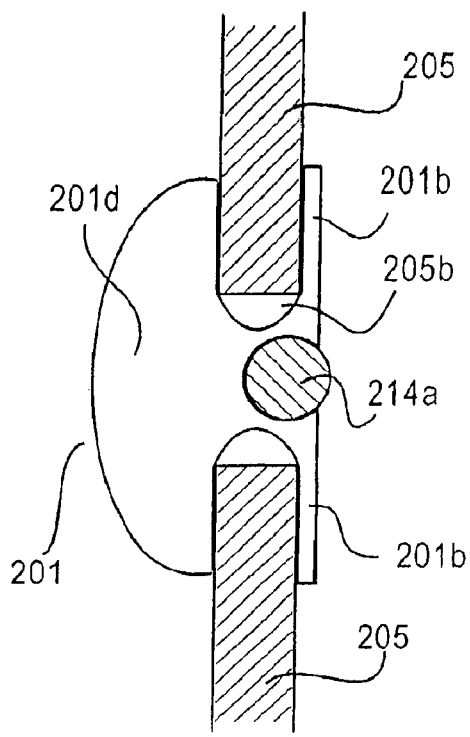
FIG. 16a is a side sectional view showing a state in which the auxiliary spectacles 205 are mounted on a spectacle body 210 by the mounting member 201.

Referring to FIG. 16, the following will more specifically discuss the steps of mounting the auxiliary spectacle 205 on the spectacle body 210 by the mounting members 201. FIG. 16a is a side sectional view showing that the auxiliary spectacle 205 is mounted on the spectacle body by the mounting member 201. In FIG. 16a, the holding part 201a holds a part around the wire rod of the endpiece 214, the concave parts 201c are fit into the hole 205b of the auxiliary spectacle 205, and the auxiliary spectacle 205 is fit into the grooves between the flat parts 201b and the head 201d.

The mounting member 201 is made of a material such as silicon and rubber having flexibility and elasticity. Further, the flat parts 201b are laterally flat so as to sandwich the holding part 201a. Thus, a surface of the flat part 201b fits on a surface of the auxiliary spectacle 205 and is prevented from being shifted with ease. Moreover, the flat parts 201b sandwich the holding part 201a from both sides, and the flat parts 201b are firmly fixed to the auxiliary spectacle 205 with intimate contact. Hence, even in the event of force separating the U-shaped part 214a of the endpiece 214 from the holding part 201a, the holding part 201a is prevented from being opened. With this configuration, the endpiece 214 is not readily removed from the holding part 201a. Additionally, since the expanded head 201d has a flat surface making contact with the auxiliary spectacle 205, the auxiliary spectacle 205 is more firmly placed in the grooves g and fixed therein. The mounting member 201 may be made of an elastic material such as plastic, which is more elastic than silicon and rubber. By using this elastic material, the holding by the holding part 201a becomes stronger.

Figure 16B:
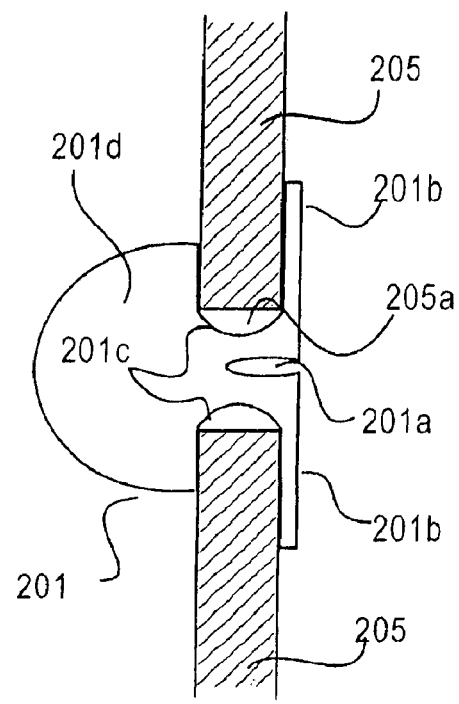
FIG. 16b is a side sectional view showing a state in which the mounting member 201 is directly fit into the hole 205b of the auxiliary spectacles 205.

The slit 205a formed on the auxiliary spectacle 205 is used to readily insert the mounting member 201 to the hole 205b. In the end, as shown in FIG. 16b, in order to fit the mounting member 201 into the hole 205b, the part of the concave parts 201c is passed through the slit 205a from the outside of the auxiliary spectacle while being compressed to the inside, and the part of the concave parts 201c is caused to slide as it is into the hole 205b. When the mounting member 201 is moved into the hole 205b, the compressed parts of the concave parts 201c is restored to the initial state due to its elasticity and is fixed thereon. At this moment, a part around the hole 205b of the auxiliary spectacle 205 is fit into the grooves g and is interposed between the flat parts 201b and the head 201d. Next, the part of the holding part 201a is brought to the U-shaped part 214a of the endpiece 214 and pressed thereto, so that as shown in FIG. 16a, the U-shaped part 214a of the endpiece 214 is fit into the holding part 201a. As described above, both sides of the holding part 201a are surrounded by the part around the hole 205a of the auxiliary spectacle which is fit into the grooves g. Hence, even when the endpiece 214 is nearly removed from the holding part, since resilience is applied to the holding part 201a from the part around the hole 205a of the auxiliary spectacle, the U-shaped part 214a of the endpiece 214 is held firmly.

Figure 16C:
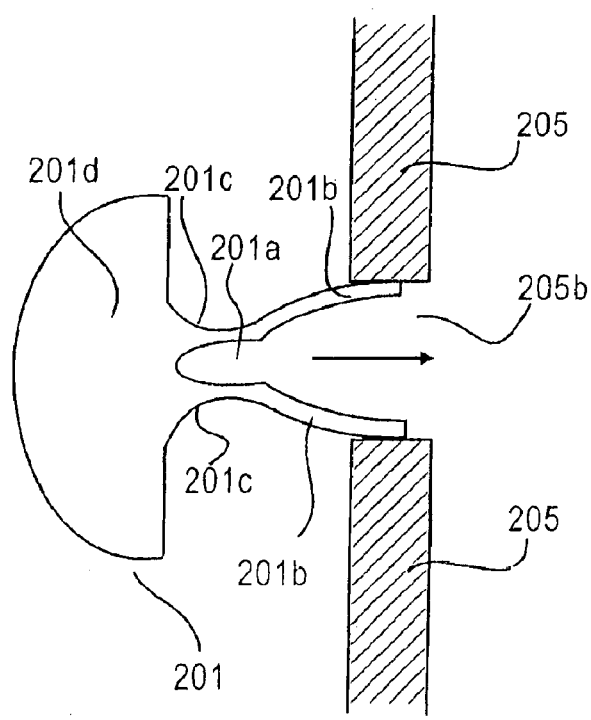
FIG. 16c is a side sectional view showing a state in which the mounting member 201 is fit into a slit 205a of the auxiliary spectacles 205.

Meanwhile, even in the case where the slit 205a is not provided on the auxiliary spectacle 205, when the mounting member 201 is made of a material having flexibility, the mounting member 201 can be fit into the hole 205b according to the method of FIG. 16c. FIG. 16c shows a state of a process in which the flat parts 201b are passed through the hole 205b while being folded, and the mounting member 201 is fit into the hole 205b. When the mounting member 201 is made of a harder material, by which the concave parts 201c are hardly compressed, it is possible to permit the mounting member 201 to slide in the slit 205b by causing a width of the slit 205b of the auxiliary spectacle 205 to be substantially equal to an interval between the pair of concave parts of the mounting member 201. In this case, since the holding part 201a is more elastic, once the U-shaped part 214a of the endpiece 214 is fit into the holding part 214a, the U-shaped part 214a cannot be removed with ease.

The above explanation described the mounting member 201 for mounting one of the auxiliary spectacles 205 on the spectacle body 210. The mounting member 201' (see FIG. 12) for mounting the other auxiliary spectacle 205 on the spectacle body 210 also has the same configuration and functions. Namely, like the mounting member 201, the mounting member 201' has a holding part for holding the U-shaped part 212a of the bridge 212, the U-shaped part 212a protruding on the front of the lens 211, flat parts extending laterally, concave parts, and an expanded head for interposing a part around the lens hole 205b between the front and rear in cooperation with the flat parts, the part being fit into grooves formed on the concave parts. Besides, the U-shaped part 212a of the bridge 212 that is held by the mounting member 201' normally has a leading end which is smaller than that of the U-shaped part 214a of the endpiece 214. In this case, it is preferable to properly change the length L of the flat parts and the size and shape of the mounting member in FIG. 14 while maintaining the functions.

Figure 17:
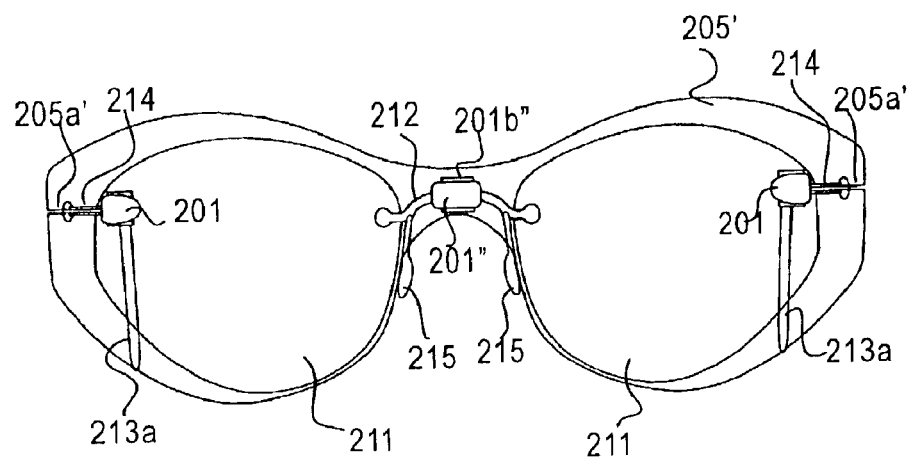
FIG. 17 is a front view showing a state in which an integral auxiliary spectacle 205' is mounted as a single piece on the spectacle body 210.

The above-described example used the auxiliary spectacles having right and left separate glasses. An auxiliary spectacle having right and left integrated glasses is also mountable. The front view of the mounting state is schematically shown in FIG. 17. In the example of FIG. 17, on three points of the pair of right and left mounting members 201 and a central mounting member 201" having the same configuration and functions as those of the mounting member 201, an auxiliary spectacle 205' is connected to the spectacle main body 210. Particularly the connection of the central mounting member 201" uses the center of the bridge which crosses a part between lenses and connects the lenses of the spectacle body 210. Namely, the holding part of the mounting member 201" is formed according to the diameter of the wire rod at the center of the bridge, and on the other hand, a hole is formed at the center of the auxiliary spectacle to fit a central constricted part of the mounting member 201" therein. Further, at least a part around the hole formed at the center of the auxiliary spectacle is interposed and fixed between flat parts and an expanded head of the mounting member 201", and the center of the bridge 212 is held by the holding part, so that the auxiliary lens is fixed at the center of the spectacle body 210.

In the example of FIG. 17, slits corresponding to the slits 205b and 205d are not formed at the center in consideration of a design and mechanical strength. However, in some cases, a slit may be formed continuously to the hole from the upper side to the lower side. When the slit is used to fit the mounting member 201" into the hole formed at the center of the auxiliary spectacle 205', it is preferable that the constricted part (concave part) of the mounting member 201" is fit into the slit and is caused to slide vertically, and then, the constricted part is rotated by 90 degrees in the hole. Moreover, in this example, like the example of FIG. 12, the flat parts 201b, 201b', and 201b" of the mounting members 201 and 201" extend vertically taken from the front of the spectacles. When such a configuration is not preferable in view of a design and so on, the flat parts may be changed in size so as to be concealed.

Besides, the above-described embodiment discussed an example of a spectacle body having a so-called rimless structure. It should be noted that the present embodiment is also applicable to a spectacle body and the like having a rim, without deviating from the idea of the present invention. Further, although the holding parts hold the endpieces of the spectacles or the parts of the bridge that protrude to the front of the spectacle body, the configuration is not limited except for the case where any limit is particularly set.

As described above, preferably by using a material which is highly flexible and elastic, the protruding part of the spectacle body, for example, the holding part which is adapted to hold a part of the end piece, the end of the bridge, or the center of the bridge is formed on one side, the expanded head is formed on the other side, and the constricted part formed between the holding part and the head is fit into the hole formed on the auxiliary spectacles, so that the auxiliary spectacles are held such that the front and rear of the auxiliary spectacles are sandwiched by the grooves formed between the head and the flat parts, and a part of the spectacle body is held by the holding part. Thus, the auxiliary spectacles can be positively mounted on the spectacle body with ease. Further, such a characteristic configuration does not limit the size of the auxiliary spectacle. Hence, for example, sunglasses with a maximum size can be used as auxiliary spectacles. In addition, it is not necessary to provide additional component for mounting the auxiliary spectacles on the spectacle main body, and the auxiliary spectacles can be reduced in thickness, thereby providing extremely lightweight spectacles without spoiling the appearance.

The above-explanation discussed the spectacles and the auxiliary spectacles according to the specific examples of the present invention. It should be understood that the configuration is not particularly limited to the above and variations are permitted within the technical scope of the present invention.

What is claimed is:

1. A lens mounting mechanism of spectacles, comprising at least two extending members which have elasticity and extend so as to cross a surface of a lens, and
   a mounting member having holding portion and head portion wherein the mounting member is adapted to be inserted to the holes or slits of the lens and wherein the holding part holds the extending member and the head portion prevents movement of the lens.

2. The lens mounting mechanism according to claim 1, characterized in that the at least two extending members extend from the center to the side rear and are connected to each other at the ends of the members.

3. The lens mounting mechanism according to claim 1, characterized in that at east one of the two extending members is deformed relative to the other extending member for an interval between the extending members to be adjustable.

4. The lens mounting mechanism according to claim 1, characterized in that the extending member is composed of a wire rod.

5. The lens mounting mechanism according to claim 1, characterized in that the at east two extending members are separately formed and comprise a connecting member for connecting the ends of the extending members.

6. The lens mounting mechanism according to claim 5, characterized in that a connecting member connects the ends to each other of the extending members so as to adjust an extending direction of the extending member from the connecting member.

7. The lens mounting mechanism according to claim 1, characterized in that the mounting member comprises a holding part for permitting the mounting member to removably hold the extending member.

8. The lens mounting mechanism according to claim 1, further comprising wing portions extending on an opposite side of the head, wherein the holding part having an inlet sandwiched by the wing portions to receive the extending member therein.

9. The lens mounting mechanism according to claim 1, characterized in that the mounting member comprises an inlet having one end opened to receive the extending member, a holding part for forming a cavity connected to the inlet, and a rod extending to the other side,
   a hole is formed on a lens so as to be fit into the rod, and
   the rod is partially subjected to melt-solidification to form the head in such a manner that the lens is prevented from moving after being fit into the hole.

10. The lens mounting mechanism according to claim 1, characterized in that the mounting member is integrally molded of plastic.

11. A mounting member provided for fixing and supporting a lens in cooperation with an extending member which extends so as to cross a tens surface, characterized in that
   the mounting member comprises an extended head, a constricted part at the center thereof, a wing extending on an opposite side of the head, and a holding part forming an inlet sandwiched by the wing to receive, the extending member, and
   the constricted part is inserted to the hole formed on the lens, and the mounting member is mounted on the lens so as to interpose the lens between the head and the wing.

12. A mounting member provided for fixing and supporting a lens in cooperation with an extending member which extends so as to cross a lens surface, characterized in that
   the mounting member comprises an inlet having one end opened to receive the extending member, a holding part for forming a cavity connected to the inlet, and a rod extending to the other side, and
   the rod is formed so as to be fit into a hole formed on the lens, and the rod is partially subjected to melt-solidification to form a head in such a manner that the lens is prevented from moving after being fit into the hole.

13. Spectacles, comprising a lens,
   at least two extending members which have elasticity and extend so as to cross a surface of the lens, and
   a mounting member for removably holding each of the extending members,
   characterized in that mounting member having holding portion and head portion wherein the mounting member is adapted to be inserted to the hole or slits of the lens and wherein the holding portion holds the extending member and the head portion prevents movement of the lens.

14. The spectacles according to claim 13, characterized in that the extending members extend from the front to the sides and have ends connected to each other, and the ends can be hung on ears.

15. The spectacles according to claim 13, characterized in that the extending member has a plurality of protruding parts which protrude outward, and the mounting member includes a holding part for removably receive the protruding part.

16. The spectacles according to claim 13, characterized in that at least one of the extending members is deformed relative to another extending member for an interval between the extending members to be adjustable.

17. The spectacles according to claim 13, characterized in that the extending member is composed of a wire rod.

18. A mounting member of auxiliary spectacles, characterized in that the mounting member is provided for mounting auxiliary spectacles an a spectacle body, and the mounting member comprises a holding part adapted to removably held a part of the spectacle body, a head portion opposite to the balding part, and wing portions wherein the holding part is defined between wing portions and grooves are provided between the head portion and the wind portions for sandwiching at least apart around a hole or a slit formed on the auxiliary spectacles.

19. The mounting member of the auxiliary spectacles according to claim 18, characterized in that the part of the spectacle body held by the holding part is a part of an endpiece or a bridge.

20. The mounting member of the auxiliary spectacles according to claim 18, characterized in that the grooves are laterally provided in a pair substantially in parallel.

21. The mounting member according to claim 18, characterized in that the grooves are formed by flat parts extending to both sides of the holding part and an expanded head formed on an opposite side of the flat parts.

22. The mounting member of the auxiliary spectacles according to claim 18, characterized in that the mounting member is made of a flexible material selected from silicon and rubber.

23. The mounting member of the auxiliary spectacles according to claim 18, characterized in that the mounting member is made of plastic.

24. Spectacles, comprising a mounting element for mounting auxiliary spectacles on the spectacles,
   characterized in that the mounting element is a protruding part formed so as to be folded from the front to the rear of the spectacles, and the protruding part is provided as an element to be held by a mounting member for mounting the auxiliary spectacles on the spectacles, wherein the mounting element is formed by a wire rod, and a part around the wire rod is held by the mounting member.

25. Spectacles, comprising a mounting element for mounting auxiliary spectacles on the spectacles,
characterized in that the mounting element of the spectacles is used as a part of a bridge for connecting lenses of the spectacles, and the part is provided as an element to be held by a mounting member for mounting the auxiliary spectacles on the spectacles, wherein the mounting element is formed by a wire rod, and a part around the wire rod is held by the mounting member.

26. Auxiliary spectacles, characterized in the auxiliary spectacles are mounted on a spectacle body by a mounting member, and the auxiliary spectacles comprises at least a slit formed inward from an edge of a lens such that a part of the mounting member is fit and slidable in the slit, and a hole formed continuously to the slit at a fixing position of the mounting member and further comprising wing portions extending on an opposite side of a head, wherein a holding part having an inlet sandwiched by the wing portions to receive an extending member therein.

* * * * *